United States Patent [19]

Nagata

[11] Patent Number: 5,220,469
[45] Date of Patent: Jun. 15, 1993

[54] MAGNETIC RECORDING AND REPRODUCING APPARATUS HAVING A LOADING RING DISPOSED TO INTERSECT PERPENDICULARLY WITH A DRUM AXIS, AND A LOADING BASE SLIDABLY MOUNTED ON AT LEAST ONE GUIDE SHAFT FIXED PERPENDICULARLY TO THE LOADING RING

[75] Inventor: Atsushi Nagata, Tokyo, Japan

[73] Assignee: Fuji Photo Film Co., Ltd., Kanagawa, Japan

[21] Appl. No.: 618,445

[22] Filed: Nov. 27, 1990

[30] Foreign Application Priority Data

Dec. 11, 1989 [JP] Japan .................. 1-321207

[51] Int. Cl.[5] .................. G11B 15/665; G11B 5/52
[52] U.S. Cl. .................. 360/85; 360/95; 360/130.22
[58] Field of Search .................. 360/85, 95, 84, 107, 360/130.22, 130.23, 130.24, 130.31, 130.32

[56] References Cited

U.S. PATENT DOCUMENTS

| | | | |
|---|---|---|---|
| 3,678,213 | 7/1972 | Sato | 360/85 |
| 3,681,539 | 8/1972 | Eibensteiner | 360/85 |
| 4,012,788 | 3/1977 | Blanding | 360/85 |
| 4,012,793 | 3/1977 | Blanding | 360/85 |
| 4,353,101 | 10/1982 | Kawai | 360/85 |
| 4,410,920 | 10/1983 | Kawai | 360/85 |
| 4,620,245 | 10/1986 | Shimizu | 360/85 |
| 4,652,946 | 3/1987 | Ryan | 360/85 |
| 4,723,182 | 2/1988 | Nakanishi | 360/85 |

Primary Examiner—Stuart S. Levy
Assistant Examiner—Craig A. Renner
Attorney, Agent, or Firm—Sughrue, Mion, Zinn, Macpeak & Seas

[57] ABSTRACT

A magnetic recording and reproducing apparatus which has a loading ring used to draw out a magnetic tape from a cassette mounted at a predetermined position and wind the magnetic tape around a rotary head drum. In the magnetic recording and reproducing apparatus, the loading ring is disposed in a plane intersecting perpendicularly with the drum axis of the rotary head drum, and a plane in which the head of the rotary head drum is rotated is parallel to a plane in which the loading ring is moved.

9 Claims, 3 Drawing Sheets

F I G . 1
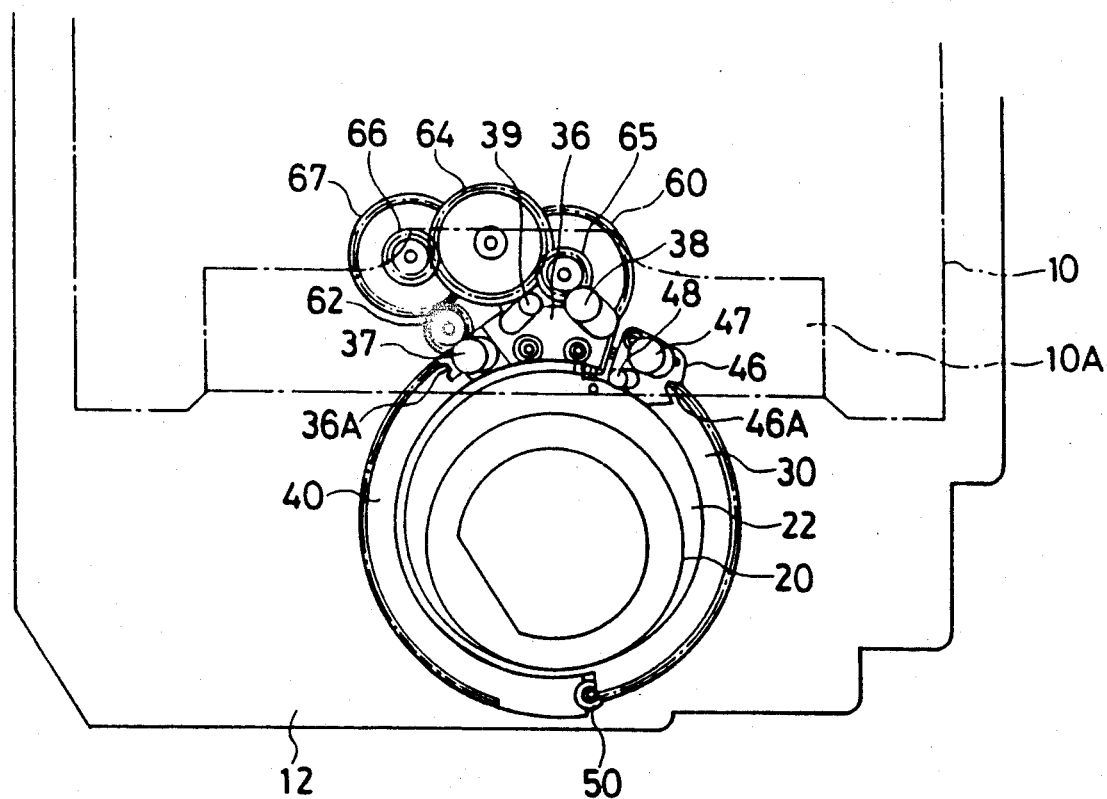

MAGNETIC RECORDING AND REPRODUCING APPARATUS HAVING A LOADING RING DISPOSED TO INTERSECT PERPENDICULARLY WITH A DRUM AXIS, AND A LOADING BASE SLIDABLY MOUNTED ON AT LEAST ONE GUIDE SHAFT FIXED PERPENDICULARLY TO THE LOADING RING

BACKGROUND OF THE INVENTION

1. Field of the Invention

The present invention relates to a magnetic recording and reproducing apparatus and, in particular, to such magnetic recording and reproducing apparatus which has a loading ring to wind a magnetic tape around a rotary head drum.

2. Description of the Related Art

Conventionally, there has been known a magnetic recording and reproducing apparatus which uses a loading ring for winding a magnetic tape obliquely around a rotary head drum and serving as a loading mechanism forming a tape path. In the magnetic recording/reproducing apparatus of this type, the loading ring is disposed around the rotary head drum and guide means such as a guide roller, a slant post and the like are provided on the upper surface of the loading ring, whereby the loading and unloading of the magnetic tape onto and from the rotary head drum can be achieved by means of the rotational movements of the ring.

The loading ring of this type is disposed in a plane intersecting perpendicularly with an axis inclined at a certain angle with respect to the shaft of the rotary head drum. That is, the loading ring is disposed inclined with respect to the rotary head drum. The reason why the loading ring is inclined is that such inclination is convenient for the magnetic tape to be drawn out obliquely from a cassette and wound obliquely around the rotary head drum. Also, if the angle of inclination of the loading ring is set to coincide with the inclination of the magnetic tape at the exit of the rotary head drum, then the magnetic tape can be run conveniently in the ring inclining direction by a guide roller provided on the drum exit side.

In general, the rotary head drum and loading ring are mounted through a drum base to a base chassis in such a manner that they are inclined at desired angles, respectively. However, due to the fact that the surfaces of the drum base for mounting the drum and ring are inclined at different angles from each other, complicated facilities are required for working such differently inclined surfaces and such working requires a long time. Also, this gives rise to the lowered working precision and takes a long time to control the running of a tape running system.

SUMMARY OF THE INVENTION

The present invention aims at eliminating the drawbacks found in the above-mentioned prior art apparatus.

Accordingly, it is an object of the invention to provide a magnetic recording and reproducing apparatus which can reduce the kinds of plane systems around a rotary head drum and a loading ring and facilitate the working of such plane systems to thereby reduce costs and improve mounting accuracy.

In order to achieve the above object, according to the present invention, there is provided a magnetic recording and reproducing apparatus which uses a loading ring for drawing out a magnetic tape from a cassette provided at a given position and for winding the magnetic tape around a rotary head drum, characterized in that the loading ring is disposed in a plane intersecting perpendicularly with the axis of the rotary head drum.

According to the invention, due to the fact that a loading ring is disposed in a plane intersecting perpendicularly with the axis of a rotary head drum, a drum mounting surface and a ring mounting surface can be arranged in parallel to each other or on the same plane. This can reduce the kinds of plane systems around the rotary head drum and also improve the mounting accuracy.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIGS. 1 and 2 are respectively plan views of main portions of an embodiment of a magnetic recording and reproducing apparatus according to the invention;

DETAILED DESCRIPTION OF THE INVENTION

Figure 2:
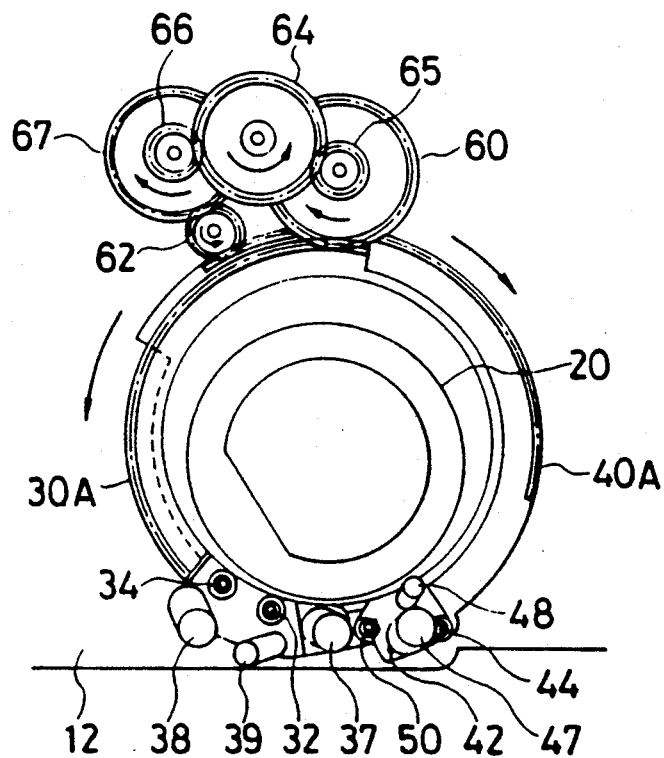

A detailed description will hereunder be given of the preferred embodiment of a magnetic recording and reproducing apparatus according to the present invention with reference to the accompanying drawings.

FIG. 1 illustrates the main portions of a preferred embodiment of a magnetic recording and reproducing apparatus according the invention in which an 8-mm video camera cassette is used as a tape cassette, and illustrates, in particular, a state of the apparatus in which the cassette 10 is mounted to a predetermined position and before tape loading is initiated. In this figure, reference numeral 20 designates a rotary head drum, 22 represents a drum base, 30 and 40 respectively express upper and lower loading rings, and 50 stands for a positioning cylindrical member.

Figure 5:
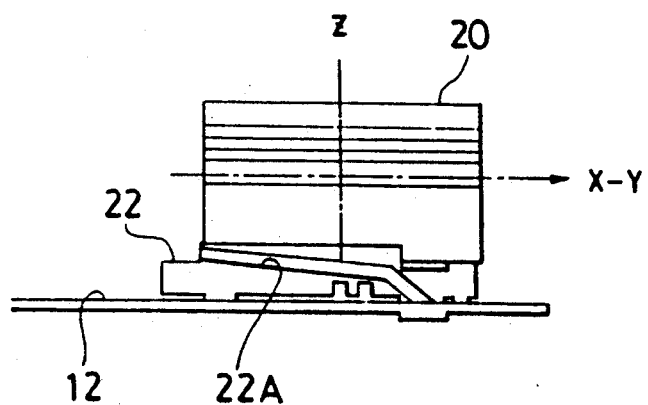
FIG. 5 is a side view of a rotary head drum and a drum base shown in FIGS. 1 and 2.

The rotary head drum 20, as shown in FIG. 5, is disposed on a base chassis 12 through the drum base 22 in such a manner that the axis of the rotary head drum in the Z-axis direction thereof is perpendicular to the base chassis 12 which is parallel to the X-Y plane. That is, the drum base 22 is arranged such that the surface of the drum base 22 for mounting the rotary head drum is parallel to the surface of the base chassis 12 for mounting the drum base 22. Also, as shown in FIG. 5, on the outer peripheral surface of the drum base 22, there is formed a cam groove 22A which is used to control the position of a loading base 36 (which will be discussed later) in the Z-axis direction.

Figure 3:
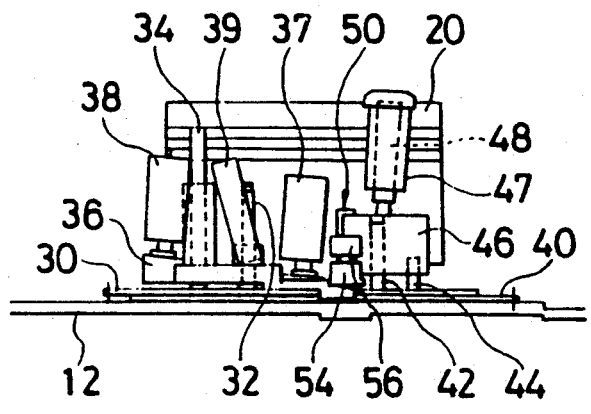
FIG. 3 is a front view of the main portions of the magnetic recording and reproducing apparatus shown in FIG. 2.

The loading rings 30 and 40 are disposed around the drum base 22 and, as shown in FIG. 3, on the base chassis 12 in such a manner that the rings are parallel to the base chassis 12. That is, loading rings 30 and 40 are respectively disposed in planes which are perpendicular to the drum shaft of the above-mentioned rotary head drum 20.

The loading rings 30 and 40 includes ring gears 30A and 40A (see FIG. 2) formed in the respective outer peripheral portions thereof, respectively, which ring gears 30A and 40A are respectively meshing with gears 60 and 62, as shown in FIG. 2. Also, the gear 60 is given a rotational drive force through a gear 65 by a gear 64 to be driven by a loading motor (not shown) while the gear 62 is given a rotational drive force by the above gear 64 through gears 66 and 67.

For this reason, if the gear 64 is driven and rotated in a counter-clockwise direction, then the loading ring 30 is rotated counter-clockwise while the loading ring 40 is rotated clockwise.

On the other hand, on the upper loading ring 30, as shown in FIG. 3, there are planted guide shafts 32 and 34 such that they extend vertically upwardly from the ring. The loading base 36 on the exit side of the drum is inserted through these guide shafts 32 and 34 in such a manner that it can be moved vertically. On the loading base 36, there are arranged guide rollers 37, 38 and a slant post 39. Also, in the leading end portion of the loading base 36, there is formed a positioning V-shaped groove 36A (see FIG. 1).

Similarly, on the lower loading ring 40, as shown in FIG. 3, there are vertically planted or fixed guide shafts 42 and 44 into which a loading base 46 on the drum entrance side is inserted in such a manner that it is movable in a vertical direction. On this loading base 46, there are disposed a guide roller 47 and a slant post 48 and, in the leading end portion of the loading base 46, there is formed a positioning V-shaped groove 46A (see FIG. 1).

Figure 4:
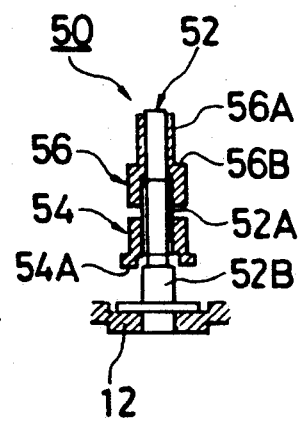
FIG. 4 is an enlarged view of the details of a positioning cylindrical member shown in FIG. 3.

Now, the positioning cylindrical member 50 is used to position the loading base 36 on the drum exit side and the loading base 46 on the drum entrance side at the time when the loading of the magnetic tape is completed. And, as shown in FIG. 4, the positioning cylindrical member 50 is vertically planted or fixed on the base chassis 12. Also, the positioning cylindrical member 50 comprises a support post 52 having a threaded portion 52A, and nuts 54, 56 which can be threadedly engaged with the threaded portion 52A of the support post 52 and can be finely adjusted in a vertical direction.

At the completion of the magnetic tape loading, the V-shaped groove 36A of the loading base 36 is brought into contact with a cylindrical portion 52B of the support post 52 to thereby position the leading end portion of the loading base 36 on the X-Y plane. Similarly, the V-shaped groove 46A of the loading base 46 is brought into contact with the cylindrical portion 56A of the nut 56 to thereby position the leading end portion of the loading base 46 on the X-Y plane.

Also, at the completion of the magnetic tape loading, the leading end portion of the loading base 36 is pushed down slightly by the lower surface 54A of the nut 54 to thereby be able to position the loading base 36 in the Z-axis direction. Similarly, the leading end portion of the loading base 46 is pushed up slightly by the upper surface 56B of the nut 56 to thereby be able to position the loading base 46 in the Z-axis direction.

Next, description will be given below in detail of a loading operation to be performed by the magnetic recording and reproducing apparatus constructed in the above manner.

In FIG. 1, there is shown a state of the magnetic recording and reproducing apparatus after the cassette 10 is mounted to a predetermined position and before the loading of the magnetic tape is started. In this state, the guide rollers 37, 38, 47, slant posts 39, 48 on the loading rings 30, 40 and the guide members to be positioned internally of the magnetic tape including right and left swing-out pins and pinch rollers provided in the tape entrance and exit of the cassette 10 (which are not shown) are all positioned within the mouth portion 10A of the cassette 10.

Now, after a tape path in the tape entrance and exit of the cassette 10 is formed by the right and left swing-out pins, if the gear 64 is rotated counterclockwise, then the loading ring 30 is rotated counterclockwise and the loading ring 40 is rotated clockwise, as shown in FIG. 2.

Figure 6:
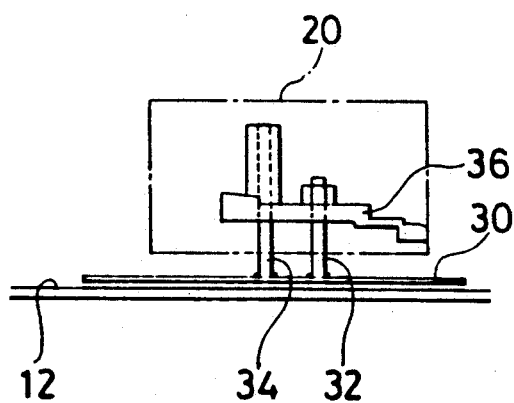
FIGS. 6 and 7 are respectively plan views used to explain the movements of a loading base in the Z axis direction thereof.
Figure 7:
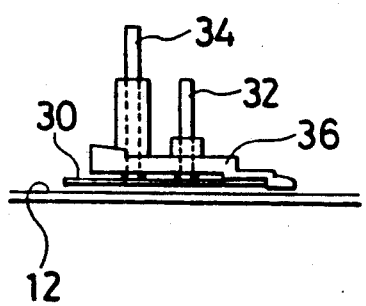

As a result of this, the loading base 36 with the guide roller 37 and the like mounted thereon is rotated with the rotation of the loading ring 30 and is moved downwardly with respect to the rotary head drum 20. That is, as shown in FIGS. 5 to 7, in the loading base 36 there is provided a cam follower (not shown) engageable with the cam groove 22A formed in the outer peripheral surface of the drum base 22 and thus, if the loading ring 30 rotated, then the loading base 36, which is arranged to be movable vertically (in the Z-axis direction) with respect to the loading ring 30, is moved vertically with the position thereof in the Z-axis direction being restricted by the cam groove 22A of the drum base 22 (see FIGS. 6 and 7).

Likewise, the loading base 46 with the guide roller 47 and the like mounted thereon is rotated with the rotation of the loading ring 40 and is moved upwardly with respect to the rotary head drum 20. The upward movement of the loading base 46 is achieved by a cam groove (not shown) formed in the drum base 22 and a cam follower formed in the loading base 46 in a similar manner to the above-mentioned case. Also, the amount of the upward movement of the loading base 46 is smaller than the amount of the downward movement of the loading base 36.

When the loading rings 30 and 40 are rotated counterclockwise and clockwise, respectively, in the above manner, then the magnetic tape stored in the cassette 10 is drawn out of the cassette 10 by the guide rollers 37 and 47 respectively disposed on the loading bases 36 and 46, and is wound obliquely around the rotary head drum 20.

And, when the loading rings 30 and 40 are rotated to the positions shown in FIG. 2, respectively, and the loading bases 36 and 46 are positioned by the positioning cylindrical member 50, respectively, then the loading of the magnetic tape is completed, whereby magnetic recording and reproduction into and from the magnetic tape obliquely wound around the rotary head drum 20 is possible.

On the other hand, to unload the magnetic tape, the gear 64 is rotated clockwise to thereby rotate the loading rings 30, 40 respectively in the opposite directions to the above-mentioned loading case.

As has been described heretofore, in accordance with a magnetic recording and reproducing apparatus according to the invention, the number of kinds of plane systems around the rotary head drum and loading rings can be reduced, and the planes can be worked with ease to thereby reduce costs and improve accuracy. In other words, the surfaces of the drum base for mounting the rotary head drum and loading rings can be arranged parallel to each other. Also, if the rotary head drum is arranged such that the drum axis thereof is vertical to the base chassis as in the illustrated embodiment of the invention, then the loading rings can also be mounted directly to the base chassis and the drum base itself can be omitted, which provides a great advantage over the prior art apparatus.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A magnetic recording and reproducing apparatus, comprising:
   a) a base chassis;
   b) a rotary head drum mounted on said base chassis and disposed on a drum axis;
   c) a loading ring rotatably mounted on said base chassis and for drawing out a magnetic tape from a cassette mounted at a predetermined position and winding the magnetic tape around said rotary head drum, said loading ring being disposed in a substantially horizontal plane intersecting perpendicularly with said drum axis, said loading ring having at least one guide shaft fixed thereto and extending substantially perpendicular therefrom; and
   d) a loading base slidably mounted on said at least one guide shaft and having loading guide members mounted thereto, said loading base being mounted for vertical movement with respect to said loading ring which remains in said substantially horizontal plane.

2. The magnetic recording and reproducing apparatus as set forth in claim 1, further comprising a drum base to which said rotary head drum is mounted, said drum base having, on an outer peripheral surface thereof, a cam portion engageable with said loading base for restricting vertical movement of said loading base along said at least one guide shaft.

3. The magnetic recording and reproducing apparatus as set forth in claim 1, wherein said rotary head drum comprises a tape guide band, and a cam portion disposed below a lead portion of said tape guide band, said cam portion being engageable with said loading base for restricting vertical movement of said loading base along said at least one guide shaft.

4. The magnetic recording and reproducing apparatus as set forth in claim 1, wherein said rotary head drum is arranged in such a manner that said drum axis intersects perpendicularly with said base chassis of said magnetic recording and reproducing apparatus and said loading ring is disposed on said bus chassis in such a manner that said loading ring is parallel to said base chassis.

5. The magnetic recording and reproducing apparatus as set forth in claim 1, further comprising a cylindrical positioning member fixedly mounted to said base chassis, said loading base being brought into contact with and positioned by said cylindrical positioning member at a time of completion of loading of the magnetic tap.

6. The magnetic recording and reproducing apparatus as set forth in claim 1, wherein a rotary center of said loading ring is disposed closer to said cassette than said drum axis and, during unloading, said loading guide members are positioned in a mouth portion of said cassette.

7. The magnetic recording and reproducing apparatus, comprising:
   a) a base chassis;
   b) a rotary head drum mounted on said base chassis and disposed on a drum axis;
   c) a pair of upper and lower loading rings, which are rotatable in directions opposite to each other and mounted on said base chassis, for drawing out a magnetic tape from a cassette mounted at a predetermined position and winding the magnetic tape around said rotary head drum, said loading rings being disposed in a substantially horizontal plane intersecting perpendicularly with said drum axis, each of said loading rings having at least one guide shaft fixed thereto and extending substantially perpendicular therefrom; and
   d) first and second loading bases slidably mounted on a corresponding said at least one guide shaft and having first and second loading guide members mounted thereto, said first and second loading bases being mounted for vertical movement with respect to said loading rings which remain in said substantially horizontal plane.

8. The magnetic recording and reproducing apparatus as set forth in claim 7, wherein rotary centers of said pair of upper and lower loading rings are disposed closer to said cassette than said drum axis and, during unloading, said first and second loading guide members are positioned in a mouth portion of said cassette.

9. The magnetic recording and reproducing apparatus as set forth in claim 7, further comprising a cylindrical positioning member fixedly mounted to said base chassis, said first and second loading bases being brought into contact with and positioned by said cylindrical positioning member at a time of completion of loading of the magnetic tape.

* * * * *